United States Patent [19]

Brem et al.

[11] Patent Number: 4,638,199
[45] Date of Patent: Jan. 20, 1987

[54] STATOR BODY WITH LAMINATED COMPRESSION PLATES

[75] Inventors: Ernst Brem, Schlieren; Josef Merki, Würenlingen, both of Switzerland

[73] Assignee: BBC Brown, Boveri & Company, Limited, Baden, Switzerland

[21] Appl. No.: 754,213

[22] Filed: Jul. 12, 1985

[30] Foreign Application Priority Data

Aug. 9, 1984 [CH] Switzerland .................. 3824/84

[51] Int. Cl.⁴ .............................................. H02K 5/00
[52] U.S. Cl. ................................... 310/91; 310/45; 310/58; 310/217; 310/259; 310/260
[58] Field of Search ............... 310/216, 217, 254, 256, 310/258, 259, 260, 89, 91, 270, 58, 59, 55, 45; 336/197

[56] References Cited

U.S. PATENT DOCUMENTS

| | | | |
|---|---|---|---|
| 1,689,187 | 10/1928 | Pohl | 310/256 |
| 2,795,714 | 6/1957 | Baudry | 310/256 UX |
| 3,619,674 | 11/1971 | Daimo | 310/58 |
| 4,031,422 | 6/1971 | Armor | 310/256 |
| 4,227,109 | 10/1980 | Mulach | 310/258 |
| 4,322,645 | 3/1982 | Spirk | 310/217 |
| 4,488,079 | 11/1984 | Dailey | 310/260 |
| 4,494,030 | 1/1985 | Mulach | 310/217 |
| 4,501,985 | 2/1985 | Dobson | 310/260 |

FOREIGN PATENT DOCUMENTS

| | | | |
|---|---|---|---|
| 0888578 | 7/1953 | Fed. Rep. of Germany | 310/260 |
| 1197971 | 8/1965 | Fed. Rep. of Germany | 310/260 |
| 2703365 | 8/1978 | Fed. Rep. of Germany | 310/260 |
| 0110404 | 8/1979 | Japan | 310/260 |
| 425981 | 6/1971 | Switzerland . | |
| 1289826 | 9/1972 | United Kingdom | 310/260 |
| 0640395 | 12/1978 | U.S.S.R. | 310/260 |

OTHER PUBLICATIONS

Swiss Journal "Bulletin SEV/VSE", vol. 68, (1977), No. 14, pp. 685–689.
Material in Electrical Machines–Today and Tomorrow–R. Noser 22nd Bernard Price Mem. Lecture, read before Cape Western Centre on Sep. 12, 1973.

Primary Examiner—R. Skudy
Attorney, Agent, or Firm—Oblon, Fisher, Spivak, McClelland & Maier

[57] ABSTRACT

The laminated stator body of a large turbo-generator consists of a stack of laminations (1) comprising laminated compression plates (2), which stack is clamped together by means of tie plates (3) and tension bolts (8). The end face of the compression plate is stepped in the axial and radial direction. The tie plates have either a contour which matches the outside contour of the compression plate (2) or are smooth and, in the latter case, are supported by arch pressure in the radial direction. The elaborate machining of the compression plate end face, resulting in the elimination of lamination shorts, can thus be omitted without impairing the electrical and magnetic effects of the laminated compression plate on the end field of the machine.

5 Claims, 9 Drawing Figures

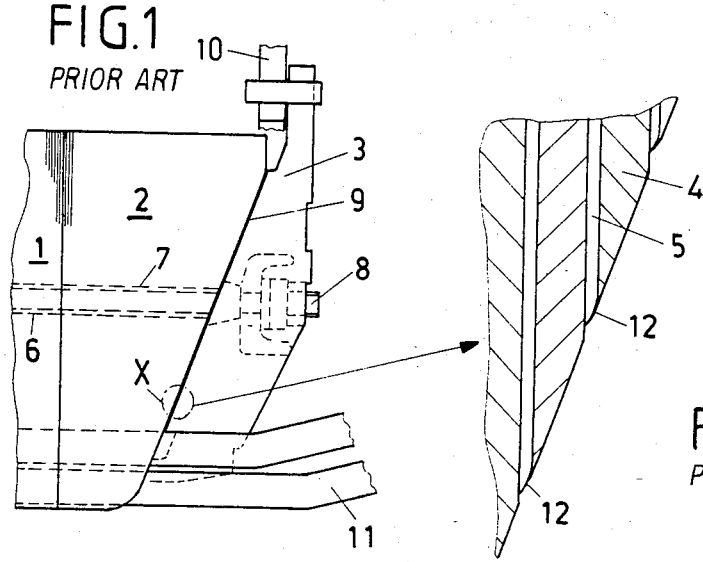
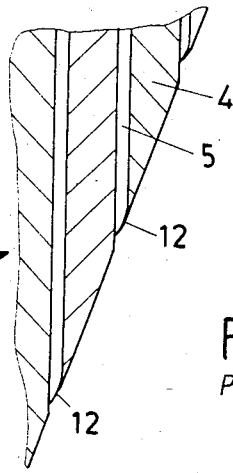
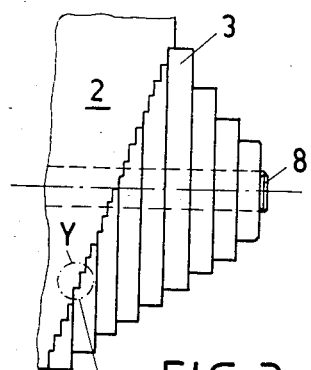
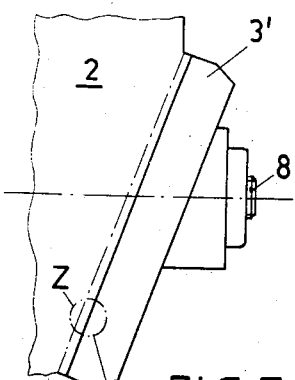
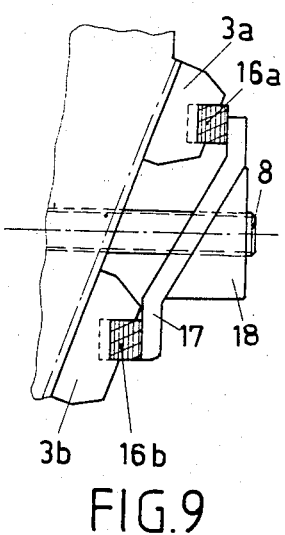
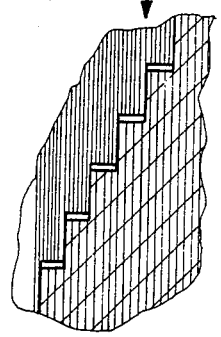
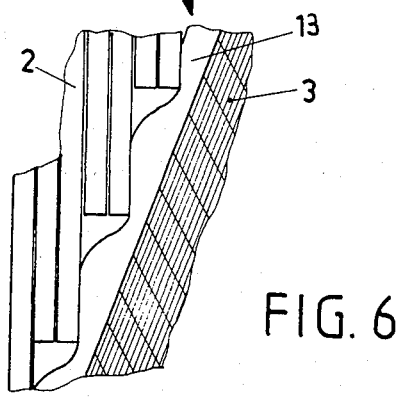

STATOR BODY WITH LAMINATED COMPRESSION PLATES

FIELD OF THE INVENTION

The invention relates to a stator body which is axially clamped between two compression plates by means of tension bolts passing through the stator and through nonmagnetic tie plates.

BACKGROUND OF THE INVENTION

A stator body of the general type involved here is disclosed, for example, in the Swiss journal "Bulletin SEV/VSE", volume 68 (1977), No. 14, pages 685–689, and particularly FIGS. 7, 8 and 9.

It has been possible in recent years to achieve a considerable increase in the specific outputs of turbo-generators by increasing the ampere-turns per centimeter in the stator and by simultaneously reducing the stray load losses. A considerable contribution to this was made by measures for reducing the overhang leakage field. The compression plates of the laminated stator body are one component which is affected by the overhang leakage field. In compression plates of the conventional type, considerable stray losses can occur with local concentration and corresponding hot spots. This affects not only the efficiency, but also the operational reliability of the machine and the capability of the machine for being operated under abnormal conditions (for example with increased underexcitation or when running asynchronously). The actual core of the set of problems is found in the abrupt transition between active part and overhang and in the lack of a magnetic insulator or genuine magnetic flux channelling outside the laminated body. These circumstances (particularly the boundary effects and uneven contours and the reaction of induced currents) make any accurate calculation of the spatial end field and its effects more difficult.

It was possible to diffuse the above problems thoroughly by using laminated compression plates. The laminated compression plate is obtained by stacking and bonding stamped magnetic steel sheets to form a ring which obtains a conical outside contour by turning down one side. The laminated stator body is pressed together by means of tension bolts passing axially through it and by means of non-magnetic tiebars which evenly rest against the outside surface of the compression plates. The conical side of the laminated compression plate acts like a continuous tapering of the active laminated body and air gap. As is demonstrated by the field pattern in FIG. 9 of the previously mentioned article in the Bulletin SEV/VSE, a continuous transition of the field densities between air gap and end space is achieved in this manner. In addition, a large proportion of the overhang leakage field finds a defined return path in the artificially extended laminated body. It is particularly the continuous contours at the end of the iron, and the fact that the eddy currents in the laminations have only a weak retroactive effect on the incoming field, resulting in clear reflection conditions, which create ideal prerequisites for simpler and conclusive field analyses.

Due to the favourable introduction of the end field into the laminated compression plate, the remagnetisation losses are uniformly distributed inside the plates and are spatially not much higher than in the active laminated body. As a development compared with conventional designs, therefore, relatively low stray losses and extremely weak heating are produced in this quite exposed part of the machine.

However, the advantageous characteristics, described above, of a laminated compression plate are obtained at the cost of increased expenditure in its production. The individual segments of magnetic steel sheets of the compression plate must not come into metallic contact with each other. However, during the machining of the end face, a burr is frequently produced which can lead to a metallic connection between adjoining segments in the radial or peripheral direction. These bridging points can become heated to an unacceptably high degree during operation and must therefore be removed—which is a tedious and time-consuming activity, especially in the case of the radial shorts.

In addition, due to the conicity of the end face of the compression plate, tie plates must be used which are completely made of non-magnetic material and which are supported on the outer circumference of the compression plate or on the stator housing. Because of the distances to be maintained to the end turns of the winding overhang, these tie plates, which extend to the stator teeth, increase the rod length and thus also the length of the entire machine.

OBJECT OF THE INVENTION

On the basis of the prior art described above, the invention is based on the object of creating a stator body having laminated compression plates which are produced more easily and more economically and which equal the known compression plate with respect to stray losses.

SUMMARY OF THE INVENTION

The invention avoids the turning down of the conical end face, hitherto considered as being unavoidable. Apart from saving a machining process, which can only be carried out on large and expensive turning lathes, and the subsequent check for lamination shorts including their elimination, the possibility is now available for designing the tie plates to be smaller, since they are now only subjected to pressure loads. In this connection, it was not possible to detect an increase in the stray losses which was actually to be expected due to the stepped end face of the compression plate.

The first embodiment disclosed herein is primarily suitable for compression plates having comparatively large radial steps. Since the clamping forces act only on counterfaces normal to the axis, the radial support of the tie plates can be omitted.

The second embodiment disclosed herein is particularly suitable for compression plates having smaller steps, where it could become too expensive to match the counterfaces of the tie plates. In this case, the radial forces are absorbed by constructing the tie plate in the form of annular segments or by holding rings which encompass all tie plates.

Because of the electrical spacings to be maintained, tie plates or tie plate parts and, if necessary, holding rings of insulating material are generally used wherever justifiable for design and/or strength reasons.

BRIEF DESCRIPTION OF THE DRAWINGS

In the text which follows, further details and developments of the subject-matter of the invention are explained in greater detail with the aid of illustrative embodiments shown in the drawing, in which:

FIG. 1 shows a longitudinal section through the end area of a laminated stator body having a laminated compression plate according to the prior art, FIG. 2 shows a detail from FIG. 1 which illustrates at an enlarged scale the bridging points at two adjoining plates, resulting from the mechanical machining of the conical end face of the compression plate, FIG. 3 shows a longitudinal section of a first embodiment of the invention having a stepped compression plate and a tie plate which matches the contour of the compression plate, FIG. 4 shows detail Y from FIG. 3 at an enlarged scale, FIG. 5 shows a second embodiment of the invention having a stepped compression plate and a tie plate with a smooth counterface and having pressure pads arranged between the compression plate and the tie plate, FIG. 6 shows detail Z from FIG. 5 at an enlarged scale, FIG. 9 shows a modification of the arrangement according to FIG. 5 comprising radially offset two-part tie plates with holding rings.

DETAILED DESCRIPTION OF THE PRESENTLY PREFERRED EMBODIMENTS

Figure 7:
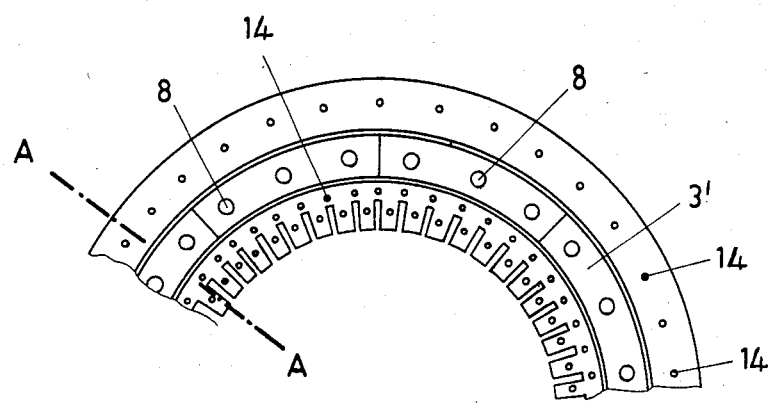
FIG. 7 shows a front view of the end face of a compression plate according to FIG. 5.

In FIG. 1, a laminated stator body is designated by 1, a laminated compression plate by 2, and a tie plate by 3. The compression plate 2 is built up of laminations of magnetic steel sheets 4, which are bonded to each other, with intermediate insulating layers 5 (FIG. 2). The laminated stator body 1 is pressed together in the axial direction by tension bolts 8 which are arranged in axially-extending holes 6 and 7 in the laminated stator body 1 and in the compression plate 2, respectively. In actual practice, a compression plate 2 and a tie plate 3 are normally found at each axial end of the stator body 1, and the tension bolts 8 are used to clamp the laminated stator body 1 between the two laminated compression plates 2. However, only one axial end and one radial side of the stator is shown in the figures. To prevent short circuits occurring between adjacent lamination layers of the compression plate 2, an intermediate insulating layer 9 is arranged between the compression plate 2 and the support area of the tie plate 3. Due to the conicity of the end face of the compression plate 2, the tie plate 3 is acted upon by a force component in the radial direction which is absorbed by a radial support of the tie plate 3 on the housing. For this purpose, the tie plates 3 project beyond the compression plate 2 and are attached to an inward-directed housing part 10. For reasons of completeness, a part of the stator winding 11 arranged in grooves of the laminated stator body 1 has been drawn in FIG. 1.

FIG. 2 illustrates how the mechanical machining of the conical end face of the compression plate 2 leads to burrs 12 which cause short circuits between adjoining magnetic steel sheets 4. Such short circuits must be removed, largely by manual work, before the compression plate 2 is installed.

According to the invention, the radial support of the tie plate 3 and the machining of the end faces of the compression plate 2 (turning down, elimination of lamination shorts) can be avoided if the end face is no longer turned down, but instead is stepped. In FIGS. 3 and 4, the compression plate 2 has a uniformly stepped outside contour. The tie plate 3 essentially consists of moulded laminated material of insulating material, for example fibre glass-reinforced plastic, and has on its face turned towards the compression plate 2 a contour which matches the stepping of the compression plate 2.

As in the prior art, the compression plate 2 is built up of individual lamination segments of magnetic steel which are offset layer by layer. The individual mutually insulated layers of laminations are bonded to each other with application of pressure and/or heat, using the familiar baking varnish or immersion bonding. This ensures a mechanically stable construction of the compression plate 2 even outside the cone of influence of the tie plates 3.

Nowadays, modern sheet stamping technology provides workpieces which are virtually free of stamping burrs, so that no short circuits occur between adjoining lamination layers.

The tie plates 3 can be composed of one piece or of several single plates bonded to each other. Each tension bolt 8 (on each machine side) can be associated in each case with a separate tie plate 3. However, the tie plates 3 can extend over several tension bolts in the peripheral direction and, in the boundary case, can be constructed as a pressure ring, in which arrangement the pressure ring or the pressure segments have recesses which ensure a free connection between the axial holes for cooling gas in the laminated stator body/compression plate and external space.

The stepping of the end face of the compression plate in the radial direction depends on the desired cone angle (approximately 15°). In the axial direction, one step is formed by between 1 and 10 lamination layers (FIG. 4).

In the embodiment of FIGS. 5 and 6, only the compression plate 32 is stepped, whilst the counterface of the tie plate is smooth. Between the compression plate 2 and the tie plate 3, a pressure pad 13 has been inserted. The pressure pad 13 consists of insulating material. The pressure pad 13 is sized, shaped and positioned to make surface-to-surface contact with the generally conical step contour of the laminated compression plate 2 and with the smooth conical contour of the non-magnetic tie plate 3.

Analogously to the arrangement of FIG. 3 and FIG. 4, the tie plates 3 are here constructed as tie segments 3' (FIG. 7), extending over several axially extending holes 6 for tension bolts 8, or as a tie ring, which are in contact with each other in the peripheral direction. In this manner, here, too, separate means for supporting the tie segments 3' or the tie ring can be omitted, since the radial forces are absorbed by the arch pressure.

Figure 8:
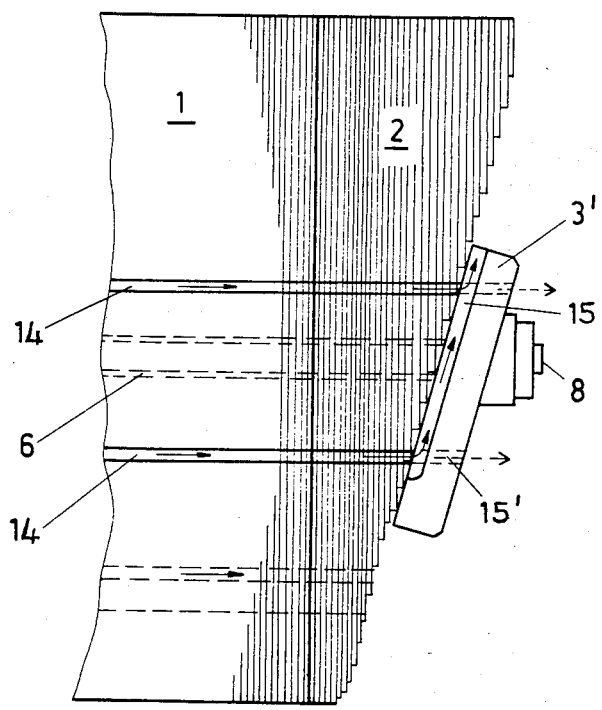
FIG. 8 shows a radial section through the compression plate according to FIG. 7 along its line AA at an enlarged scale.

Apart from the axially extending holes 6 for the passage of the tension bolts 8, the laminated stator body 1 and also the compression plate 2 have holes 14 for cooling gas. It can be seen from FIG. 8 that the flow of cooling gas (identified by arrows) is not impaired by placing radially-extending grooves 15 into the surface facing the compression plate 2, of the tie segment 3', which grooves 15 are freely connected to the holes 14 for the cooling gas. Instead of the grooves 15, holes 15' can also be provided in the tie segments 3' as is indicated by dashes in FIG. 8.

FIG. 9 shows another embodiment of the invention having separate two-part tie plates 3a, 3b which are in each case supported on a support ring 16a and 16b, respectively. In this arrangement, the tensile force of the tension bolt 8 is transferred to the two tie plate parts 3a and 3b via a link 17, which covers both rings, and an adaptor wedge 18.

What is claimed is:

1. A stator comprising a stator body (1) which is axially compressed at one axial end by a compression plate (2) by means of a tension bolt (8) passing through said compression plate (2) and non-magnetic tie plates (3), in which arrangement said compression plate (2) comprises laminations (4) which are stacked together and bonded to each other, said compression plate (2) having a conical outside contour on the outside surface facing away from said stator body (1), said compression plate (2) having a stepped outside contour, said non magnetic tie plates (3) having on the surface facing said compression plate (2) a contour which essentially matches the stepping of said compression plate (2), said non-magnetic tie plates (3) comprising individual annular segments (3') and having on the surface facing said compression plate (2) radially-extending grooves (15) which communicate with axially extending holes (14) for cooling gas in said compression plate (2).

2. A stator comprising a stator body (1) which is axially compressed at one axial end by a compression plate (2) by means of a tension bolt (8) passing through said compression plate (2) and non-magnetic tie plates, in which arrangement said compression plate (2) comprises laminations (4) which are stacked together and bonded to each other, said compression plate (2) having a conical outside contour on the outside surface facing away from said stator body (1), said compression plate (2) having a stepped outside contour, said non-magnetic tie plates resting against said compression plate (2) with interposition of a pressure pad (13), said non-magnetic tie plates being supported in the radial direction by a support ring (16a, 16b) which acts in conjunction with said non-magnetic tie plates.

3. A stator according to claim 2, wherein:
   (a) said non-magnetic tie plates are constructed of several parts (3a, 3b) and said tie plate parts (3a, 3b) are connected to each other in the peripheral direction by a support ring (16a, 16b) on which support ring said non-magnetic tie plate parts (3a, 3b) are supported in the radial direction and
   (b) said tension bolts (8) act via links (17) on said support rings (16a, 16b) and thus on said non-magnetic tie plate parts (3a, 3b).

4. A stator according to claim 3, wherein each one of said non-magnetic tie plates comprises a ring of fiber-reinforced plastic having fibers which extend in the peripheral direction and in the radial direction and the conical support face of said support ring is provided with radially-extending grooves (15) which communicate with axial holes (14) for cooling gas in said compression plate (2).

5. A stator comprising:
   (a) a laminated stator body having a planar axial end surface;
   (b) a laminated compression plate having:
      (i) a planar axial end surface making planar surface contact with said planar axial end surface of said laminated stator body and
      (ii) a generally conical, stepped contour facing away from its planar axial end surface;
   (c) a non-magnetic tie plate having a smooth conical contour facing said generally conical, stepped contour of said laminated compression plate;
   (d) a pressure pad disposed between said generally conical, stepped contour of said laminated compression plate and said smooth conical contour of said non-magnetic tie plate, said pressure pad being sized, shaped, and positioned to make surface-to-surface contact with said generally conical, stepped contour of said laminated compression plate and with said smooth conical contour of said non-magnetic tie plate; and
   (e) a tension bolt passing through aligned holes in said laminated stator body, said laminated compression plate, said pressure pad, and said non-magnetic tie plate,
   whereby, in use, said tension bolt is used to clamp said laminated stator body between two laminated compression plates.

* * * * *